United States Patent
Bureau et al.

(10) Patent No.: US 7,956,099 B2
(45) Date of Patent: Jun. 7, 2011

(54) MODIFICATION PROCESS FOR POLYMER SURFACES, NOTABLY FOR HYDROXYLATION OF POLYMER SURFACES AND PRODUCTS SO OBTAINED

(75) Inventors: Christophe Bureau, Juvisy-sur-Orge (FR); Jean Pinson, Fontenay-sous-Bois (FR)

(73) Assignee: Alchimer, Massy (FR)

( * ) Notice: Subject to any disclaimer, the term of this patent is extended or adjusted under 35 U.S.C. 154(b) by 0 days.

(21) Appl. No.: 12/089,959

(22) PCT Filed: Oct. 10, 2006

(86) PCT No.: PCT/FR2006/002269
§ 371 (c)(1),
(2), (4) Date: Jun. 10, 2008

(87) PCT Pub. No.: WO2007/042658
PCT Pub. Date: Apr. 19, 2007

(65) Prior Publication Data
US 2008/0269423 A1    Oct. 30, 2008

(30) Foreign Application Priority Data
Oct. 11, 2005  (FR) ..................................... 05 10370

(51) Int. Cl.
*C08J 3/28* (2006.01)
(52) U.S. Cl. ........ 522/129; 525/383; 525/437; 525/462; 525/333.3; 525/370; 525/387; 522/134; 522/179; 522/182

(58) Field of Classification Search ............... 525/333.3, 525/370, 387, 437, 462, 383; 522/129, 134, 522/179, 182
See application file for complete search history.

(56) References Cited

U.S. PATENT DOCUMENTS
5,618,887 A * 4/1997 Bamford et al. ............. 525/279

FOREIGN PATENT DOCUMENTS
| EP | 0 949 277 A2 | 10/1999 |
| GB | 1 414 671 A | 11/1975 |
| WO | 2004/043614 A1 | 5/2004 |

OTHER PUBLICATIONS

Tzedakis, T.; Savall, A.; Clifton, M.J.; Journal of Applied Electrochemistry, 1989, vol. 19, p. 911-921.*
Eastman; Ecdel product data sheet, Dec. 2004, p. 1-8 [online], accessed via the Internet [retrieved on Apr. 27, 2010], URL: <http://www.eastman.com/Literature_Center/P/PPM210.pdf>.*
Bamford, C.H.; Al-Lamee, K.G.; Macromolerular Rapid Communications, 2994, p. 379-384.*

* cited by examiner

*Primary Examiner* — David Wu
*Assistant Examiner* — Robert Jones
(74) *Attorney, Agent, or Firm* — Young & Thompson

(57) ABSTRACT

Described is the use of RO˙ radicals, R being a hydrogen, an alkyl group having 2 to 15 carbons, an acyl group —COR' in which R' represents an alkyl group having 2 to 15 carbons, or an aroyl group —COAr in which Ar represents an aromatic group having 6 to 15 carbons, for the hydroxylation, alkoxylation or oxycarbonylation of polymer or polymer mixture surfaces, the said polymers consisting in monomeric units of which at least 50% among these are aromatic units and the said RO˙ radicals being generated by electrochemical or photochemical methods.

17 Claims, 1 Drawing Sheet

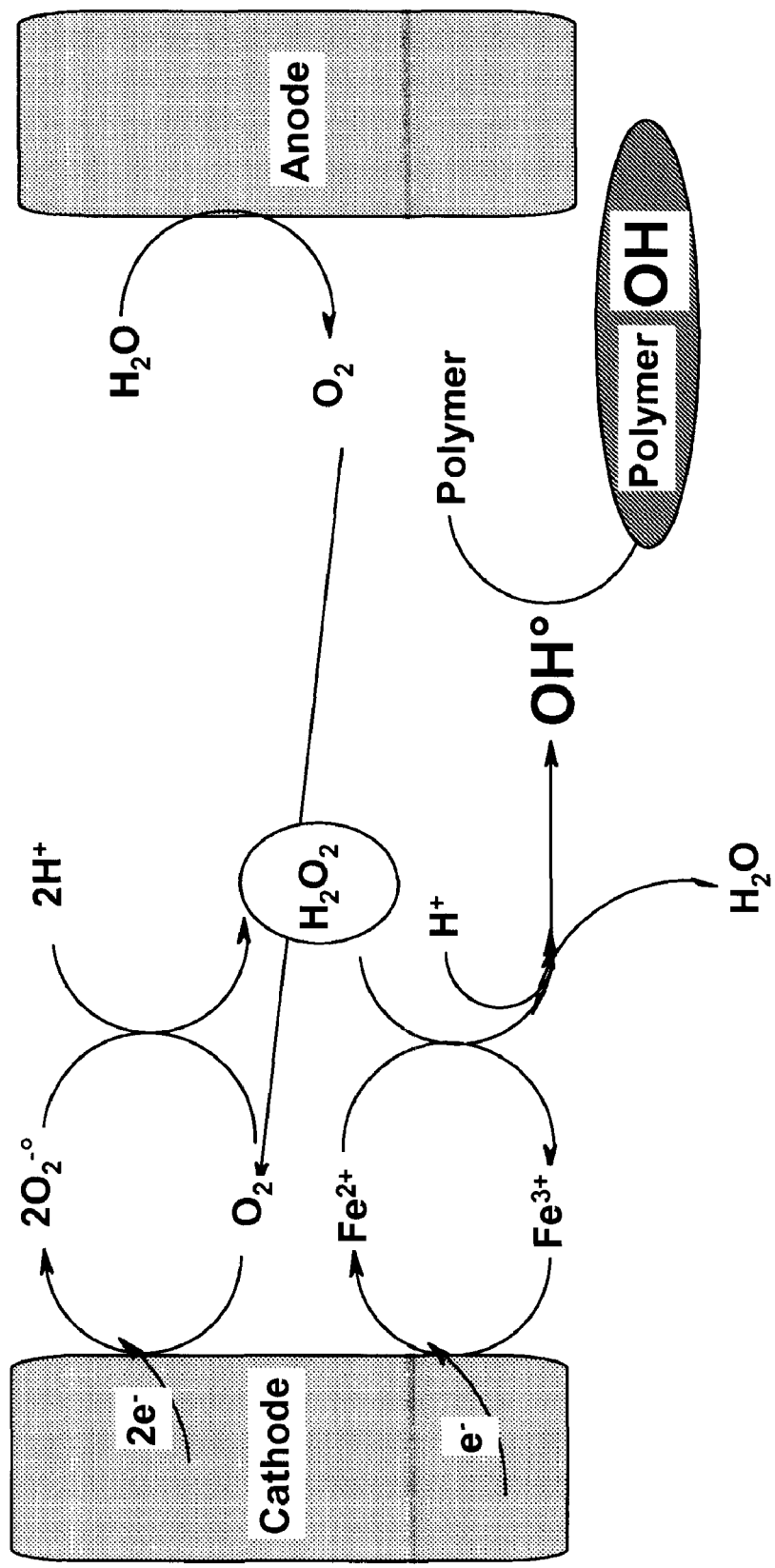
Figure

MODIFICATION PROCESS FOR POLYMER SURFACES, NOTABLY FOR HYDROXYLATION OF POLYMER SURFACES AND PRODUCTS SO OBTAINED

The object of the present invention concerns a modification process of polymer surfaces, and notably a hydroxylation process of polymer surfaces, as well as the surfaces so modified.

Electrografting allows the functionalisation of electrical conducting and semi-conducting surfaces. One of the main benefits of electrografting is the energy that allows both the formation of interfacial bonds and the growth of films on the surface: therefore, it is the surface itself which generates its own functionalisation. This property has, for example, for consequence that the electrografted layers fill with great precision the surface topology on which they have been carried out, and even on a nanometric scale. On a macroscopic scale, it also has for consequence that the electrografting delivers coatings on pieces having an arbitrary complex form with an even quality throughout: everywhere where the surface is wet by the electrografting solution, there will be an electrografted film formed.

It is clearly impossible to carry out electrografting on insulant surfaces, at least under its usual form, given that the direct activation of the insulant by its nature is impossible by electrical means.

In order to propose functionalisations of similar quality on any type of surfaces, it is necessary to develop grafting processes on insulants, by searching—either in the molecular precursors, or in the surface activation techniques—specificities which allow to maintain the essential elements needed for the electrografting: interfacial bonding (covalent or non-covalent), conformity, homogeneity . . . .

It is interesting to functionalise the polymer surfaces to impart them with specific properties of hydrophily, hydrophoby, adsorption or non-adsorption of proteins or other biological molecules, binding of any types of organic or inorganic materials, adherence, more generally any desirable property for the desired application and being able to refer to a modification of functions offered by the surface of the considered object. This can be realised directly or by post-functionalisation, after initial treatment destined to make the surface more reactive.

An object of the present invention is to provide a process for the preparation of modified surfaces from polymer surfaces, particularly by use of OH$^{\bullet}$ or OR$^{\bullet}$ radicals.

A further object of the present invention is to provide modified polymer surfaces, particularly made hydrophilic, being able after to be used in subsequent functionalisation reactions.

The present invention concerns the use of RO$^{\bullet}$ radicals, R being a hydrogen, an alkyl group having 2 to 15 carbons, an acyl group —COR' in which R' represents an alkyl group having 2 to 15 carbons, or an aroyl group —COAr in which Ar represents an aromatic group having 6 to 15 carbons, for the hydroxylation, alkoxylation or oxycarbonylation of polymer or polymer mixture surfaces, particularly hydrophobic ones, the said polymers consisting in monomeric units of which at least 50% among these are aromatic units and the said RO$^{\bullet}$ radicals being generated by electrochemical or photochemical means.

The present invention also concerns the use of HO$^{\bullet}$ hydroxyl radicals, for the hydroxylation of hydrophobic polymer surfaces, the said polymers consisting in monomeric units of which at least 50% among these are aromatic units.

The term "surface hydroxylation" means the binding of hydroxyl groups (—OH) on the said surfaces.

The term "surface alkoxylation" means the binding of alkoxy groups (—OR) on the said surfaces, R being an alkyl group as defined above.

The term "surface oxycarbonylation" means the binding of oxycarbonyl groups (—OCOR' or —OCOAr, R' and Ar being as defined above) on the said surfaces.

The term "polymer mixtures" means a material obtained by mixing at least two polymers. For example, the polymer Acrylonitrile-Butadiene-Styrene is a material obtained by dispersing a grafted elastomeric phase (butadiene) in a styrene phase: styrene-acrylonitrile copolymer.

The term "monomeric units" means the repetitive units in the polymer.

The term "aromatic units" means units containing an aromatic ring, i.e. a ring containing 4n+2 electrons delocalised in the entire cycle.

The present invention also concerns the use of the Fenton reaction, for the hydroxylation, alkoxylation or oxycarbonylation of polymer or polymer mixture surfaces, the said polymers consisting in monomeric units of which at least 50% among these are aromatic units, the Fenton reaction being carried out by electrochemical or photochemical means.

The term "Fenton reaction" means a reaction which allows to produce hydroxyl radicals by reaction of hydrogen peroxide with iron (II).

This reaction can be represented by the following reaction scheme:

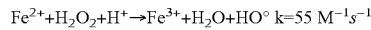

$$Fe^{2+}+H_2O_2+H^+ \rightarrow Fe^{3+}+H_2O+HO^{\bullet} \quad k=55\ M^{-1}s^{-1}$$

The reaction is particularly described in the following articles: Fenton, H., J., H. *J. Chem. Soc.* 1894, 65, 899; Haber, F.; Weiss, *J. Proc.Roy. Soc, A.* 1934, 134, 332 Barb.; W. G.; Baxendale, J., H.; George, P.; Hargrave, K. R. *Nature* 1949, 163, 692 Walling, C.; Weil, T. *Int. J. Chem. Kinet.* 1974, 6, 507; Gallard, H.; DeLaat, J.; Legube, B. *Wat. Res.* 1999, 33, 2929.

This reaction has also been applied, in the scope of the current invention, by replacing hydrogen peroxide with a peroxide ROOR, R being as defined above.

Various polymers possessing aromatic units, in particular PEEK, are used in biomedical applications. For such applications, the users wish to conserve the mechanical properties of the polymer while making its surface hydrophilic. In addition, surface hydroxylation can allow after to carry out some post-functionalisations, i.e. binding new functions with specific properties on the surface.

More particularly, with regards to PEEK hydroxylation, the reaction has been carried out until now by reduction of the ketone functionality (Noiset, O.; Schneider, Y.-J.; Marchand-Brynaert, J. *J. Biomat. Sci., Polymer Ed.* 2000, 11, 767; Henneuse-Boxus, C.; De Ro, A.; Bertrand, P.; Marchand-Brynaert, *J. Polymer* 2000, 41, 2339; Henneuse-Boxus, C.; Poleunis, C.; De Ro, A.; Adriaensen, Y.; Bertrand, P.; Marchand-Brynaert, J. *Surface and Interface Analysis* 1999, 27, 142; Noiset, O.; Schneider, Y-J; Marchand-Brynaert, J. *J. Pol. Sci.*, Part A: Polymer Chemistry 1997, 35, 3779), that of PET by hydrolysis of ester functionalities (Mougenot, P.; Koch, M.; Dupont, 1.; Schneider, Y.-J.; Marchand-Brynaert, J. *J. Colloid and Interface Sci.* 1996, 177, 162), by plasmas (Cheng, T.-S.; Lin, 14.-T.; Chuang, M.-J. *Materials Letters* 2004, 58, 650) (the authors have succeeded to make one hydrophilic face and the other one hydrophobic)

It is particularly advantageous to use the Fenton, Electro-Fenton and PhotoFenton reactions because they are applicable to polymers independently of their chemical structure: the reactions are therefore non-specific of the chemical structures of the polymers.

According to an advantageous embodiment, the present invention concerns the use such as defined above, characterised in that the Fenton reaction is realised by electrochemical means, i.e. by the use of the FlectroFenton reaction.

The ElectroFenton reaction (Tomat, R.; Vecchi, A. *J. Appl. Electrochem.* 1971, 1, 185; Oturan, M. A.; Pinson, J. *New J. Chem* 1992, 16, 705; Fang, X.; Pam, X.; Rahman, A. P. *Chem.Eur. J.* 1995, 1, 423; Gallard, H.; DeLaat, J. *Chemosphere* 2001, 42, 405; Matsue. T., Fuijihira, M.; Osa, T. *J. Electrochem.Soc.* 1981, 128, 2565; Fleszar, B.; Sobkoviak, A. *Electrochim. Act.* 1983, 28, 1315; Tzedakis, T.; Savall, A.; Clifton, M., J. *J. Appl. Electrochem.* 1989, 19, 911; Oturan, M. A.; Oturan, N.; Lahitte, C.; Trévin, S. *J Electranal. Chem.* 2001, 507, 96; Brillas, E.; Casado, J. *Chemosphere* 2002, 47, 241) is a variant of the Fenton reaction and consists of a catalytic reaction where $Fe^{2+}$ is regenerated continuously at the cathode at the same time as oxygen is reduced to give hydrogen peroxide.

While the Fenton reaction by mixing hydrogen peroxide and $Fe^{2+}$ leads to hydroxyl radical production by "blast" (i.e. a rapid production of hydroxyl radicals), the ElectroFenton reaction provides a continuous production of this radical as long as the potential allowing for the reduction of Fe(II) to Fe(III) is maintained. In addition, this reaction is used for the complete degradation in a few hours of toxic effluent which is finally transformed to $CO_2$ et $H_2O$.

BRIEF DESCRIPTION OF THE DRAWINGS

The FIGURE is a variant of the Fenton reaction and depicts a catalytic reaction where $Fe^{2+}$ is regenerated continuously at the cathode at the same time as oxygen is reduced to give hydrogen peroxide.

DETAILED DESCRIPTION OF THE INVENTION

According to another advantageous embodiment, the present invention concerns the use as defined above, characterised in that the Fenton reaction is realised by photochemical means, i.e. by the use of the PhotoFenton reaction.

The PhotoFenton reaction (Brillas, E.; Sauleda, R.; Casado, *J. Electrochem. Soc.* 1998, 145, 759) is a variant of the Fenton reaction, corresponding to the following mechanism:

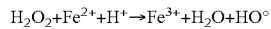

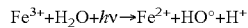

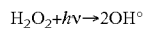

As for the ElectroFenton reaction, this reaction provides a continuous production of hydroxyl radicals as long as there is hydrogen peroxide.

The present invention also concerns a hydroxylation, alkoxylation or oxycarbonylation process of a polymer or polymer mixture surface, the said polymers consisting in monomeric units of which at least 50% among these are aromatic units, to obtain a hydroxylated, alkoxylated or oxycarbonylated surface, the said process being characterised in that it consists of reacting the said surface with RO˙ radicals, R being a hydrogen, an alkyl group having 2 to 15 carbons, an acyl group —COR' in which R' represents an alkyl group having 2 to 15 carbons, and in particular a butyl or lauryl group, or an aroyl group —COAr in which Ar represents an aromatic group having 6 to 15 carbons, in particular a phenyl group, the said RO˙ radicals being generated by electrochemical or photochemical means.

The term "hydroxylated surface" means a surface containing hydroxyl groups (—OH).

The term "alkoxylated surface" means a surface containing alkoxy groups (—OR), R representing an alkyl group as defined above.

The term "oxycarbonylated surface" means a surface containing oxycarbonyl groups (—OCOR' or —OCOAr, R' and Ar being as defined above). According to a particular embodiment, the oxycarbonalyted surfaces obtained according to the process of the invention contain —COR' or —COAr groups, R' and Ar being as defined above.

The RO˙ radicals are obtained by cleavage of RO—OR peroxide catalysed by Iron (II).

The HO˙ radicals are formed by cleavage par hydrogen peroxide $H_2O_2$ catalysed by Iron (II).

A preferred hydroxylation process according to the invention is characterised in that it involves reacting the surface with HO˙ hydroxyl radicals.

The present invention also concerns a hydroxylation process of polymer surfaces, particularly hydrophobic ones, the said polymers consisting in monomeric units of which at least 50% among these are aromatic units, particularly chosen from the following aromatic groups: phenyl, anthryl, naphthyl, biphenyl, phenanthryl, pyrenyl, pyridyl, pyrimidyl, pyrazinyl, pyridazinyl, quinoxalyl, quinazolyl, quinolinyl, thiophenyl, pyrrolyl, phenathrolinyl, phenanthridinyl, indolyl and carbazolyl, to obtain a hydroxylated surface, the said process being characterised in that it involves reacting the said surface with HO˙ hydroxyl radicals obtained by the Fenton reaction, by electrochemical or photochemical means (ElectroFenton or PhotoFenton reaction).

The monomeric units are therefore chosen from units of the following formulae:

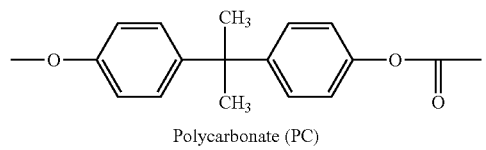

Polycarbonate (PC)

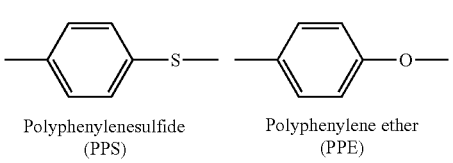

Polyphenylenesulfide (PPS)

Polyphenylene ether (PPE)

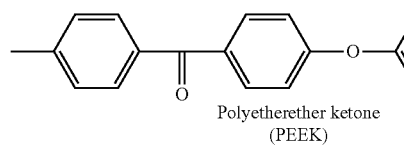

Polyetherether ketone (PEEK)

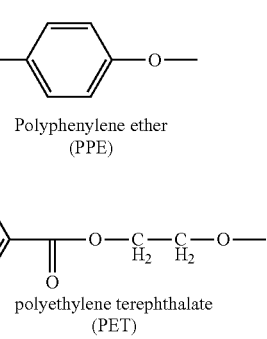

polyethylene terephthalate (PET)

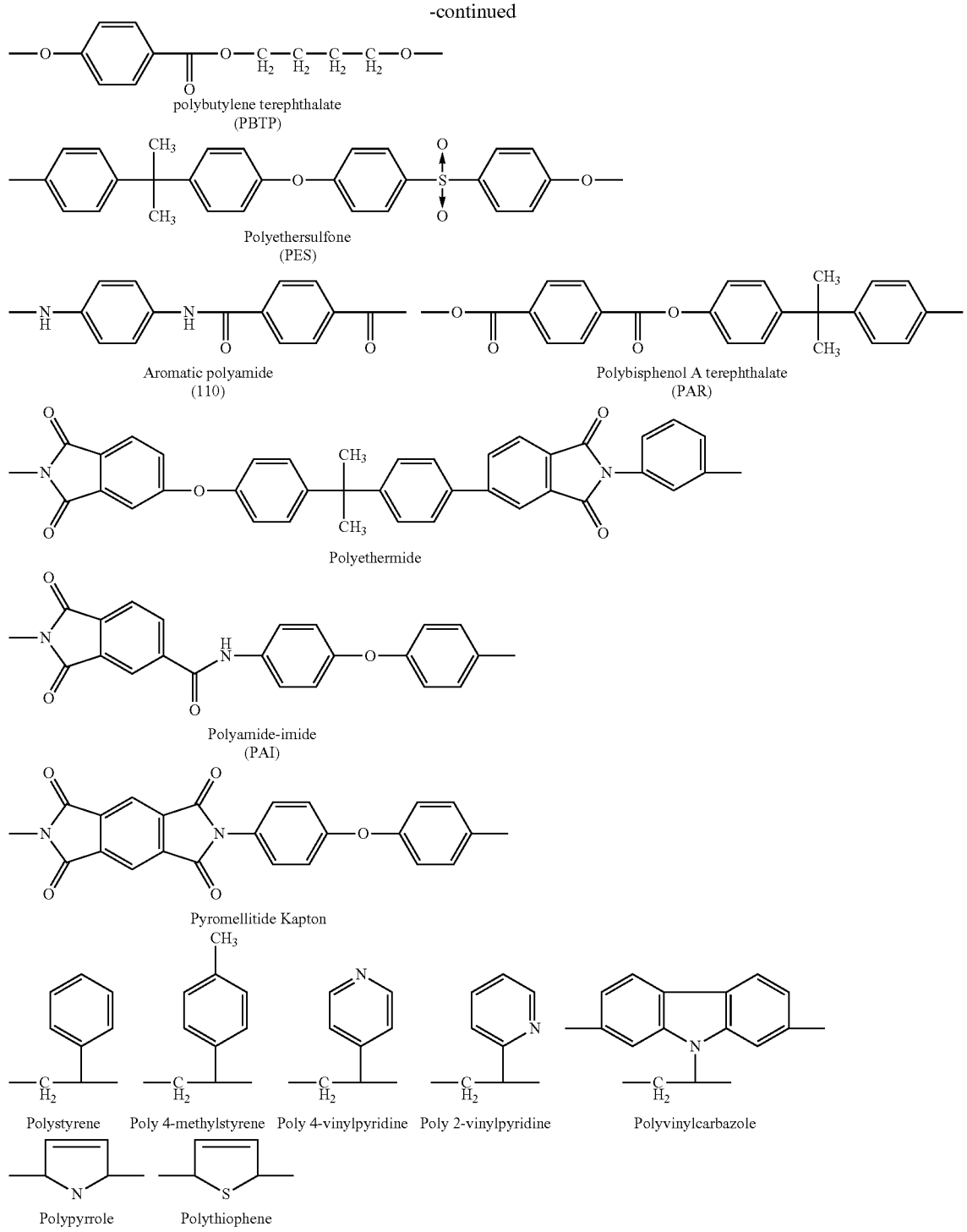

Preferably, the polymers implicated in the invention are different from polysiloxanes polymers.

The present invention concerns the process as defined above, characterised in that the HO• hydroxyl radicals are obtained by mixing hydrogen peroxide and ferric ($Fe^{3+}$) or ferrous ($Fe^{2+}$) ions.

According to an advantageous embodiment, the process of the invention is characterised in that the HO• hydroxyl radicals are obtained by the ElectroFenton reaction.

According to an advantageous embodiment, the process of the invention, including the use of the ElectroFenton reaction, is characterised in that hydrogen peroxide is obtained directly by the electrochemical reduction of oxygen in an acidic medium, and in that the HO• hydroxyl radicals are provided from the reaction of ferrous ions with hydrogen peroxide.

The term "electrochemical reduction of oxygen" means the transfer of two electrons and two protons to oxygen to give hydrogen peroxide.

The term "acidic medium" means a medium where the pH is below 7 more particularly is between 2 and 4, more precisely equal to 3.

The present invention also concerns a process as defined above characterised in that the HO• hydroxyl radicals are obtained by the use of the PhotoFenton reaction.

According to an advantageous embodiment, concerning the use of the PhotoFenton reaction, the process of the invention is characterised in that the hydrogen peroxide is added to the polymer surface, and in that the HO• hydroxyl radicals are obtained by putting into contact the said surface with an aqueous solution containing hydrogen peroxide and a ferrous salt, particularly iron chloride or sulfate, and by irradiation of the said surface and the said solution.

The term "putting into contact the said surface with an aqueous solution" means the immersion of the surface in the solution, or the deposit of a volume, for example a drop, of the said solution on the said surface.

The term "irradiation of the said surface and of the said solution" means the fact to illuminate the solution and the surface(s) with a lamp emitting appropriate wavelengths, particularly in the ultraviolet region, i.e. wavelengths below 400 nm.

According to another advantageous embodiment, the present invention concerns the process as defined above, characterised in that the polymers are immerged in an aqueous solution containing hydrogen peroxide and a ferrous salt, particularly iron chloride or sulfate, and in that the said solution and the polymers are irradiated with a UV lamp.

The present invention also concerns the process as defined above, characterised in that the polymers contain monomeric units having a molecular weight from about 500 to about 5 millions daltons.

A molecular weight of 500 daltons corresponds to the lower limit of polymer molecular weights and a molecular weight of 5 million daltons corresponds to the mass of UHMW polyethylene (UltraHigh Molecular Weight).

The present invention also concerns a process as that defined above, characterised in that the polymers are chosen from: polycarbonate (PC), polyphenylenesulfide (PPS), polyphenylene ether (PPE), polyetherether ketone (PEEK), polyethylene terephthalate (PET), polyether sulfone (PES), polyaromatic amide (PPA), polybisphenol terephthalate (PAR), polyetherimide (PEI), polyamide-imide (PAI, Torlon®), polypyrromellitide (Kapton®), polystyrene, poly(4-methylstyrene), poly(4-vinylpyridine) (4VP) or poly(2-vinylpyridine) (2VP) and polyvinylcarbazole.

The formulae of the different polymers are represented by the following:

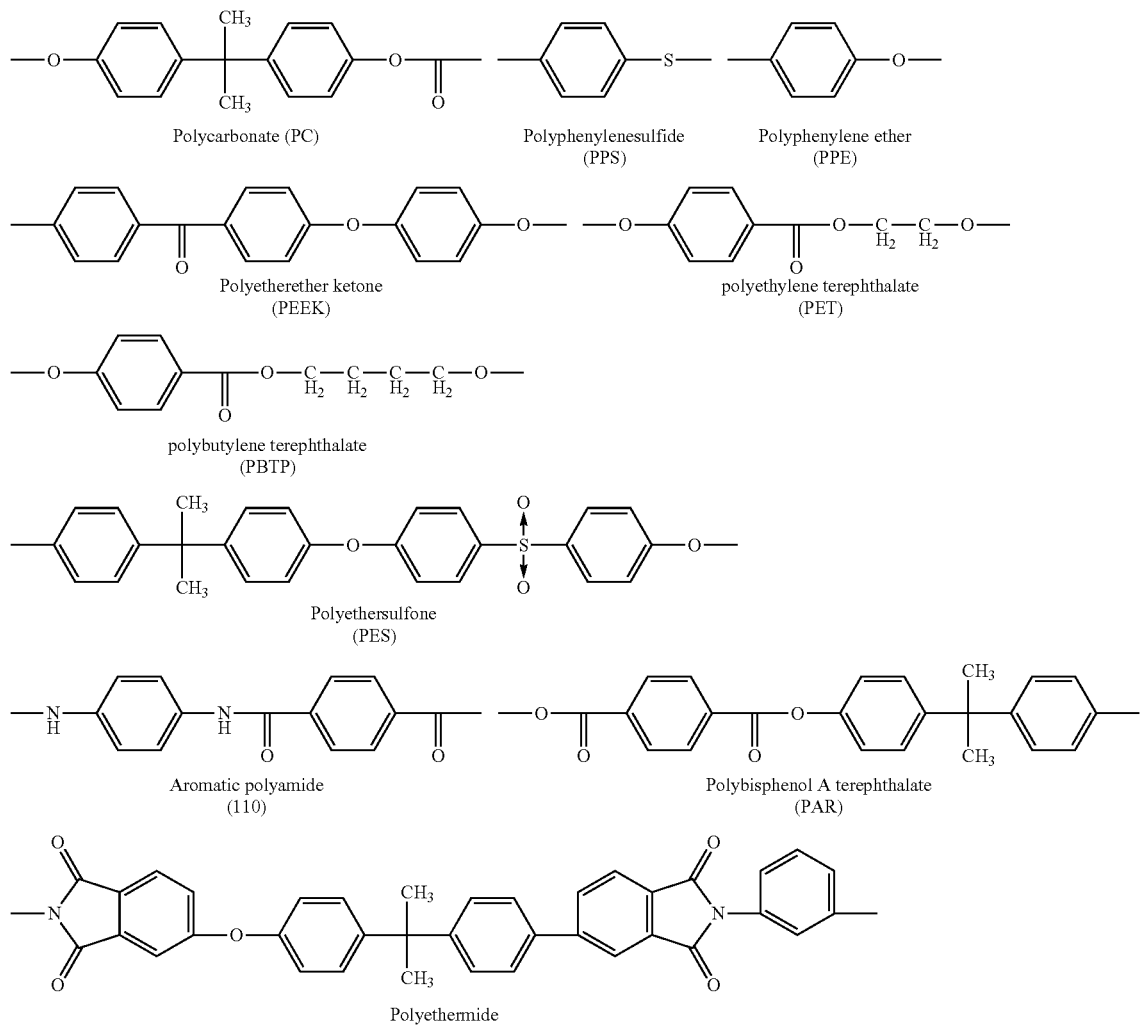

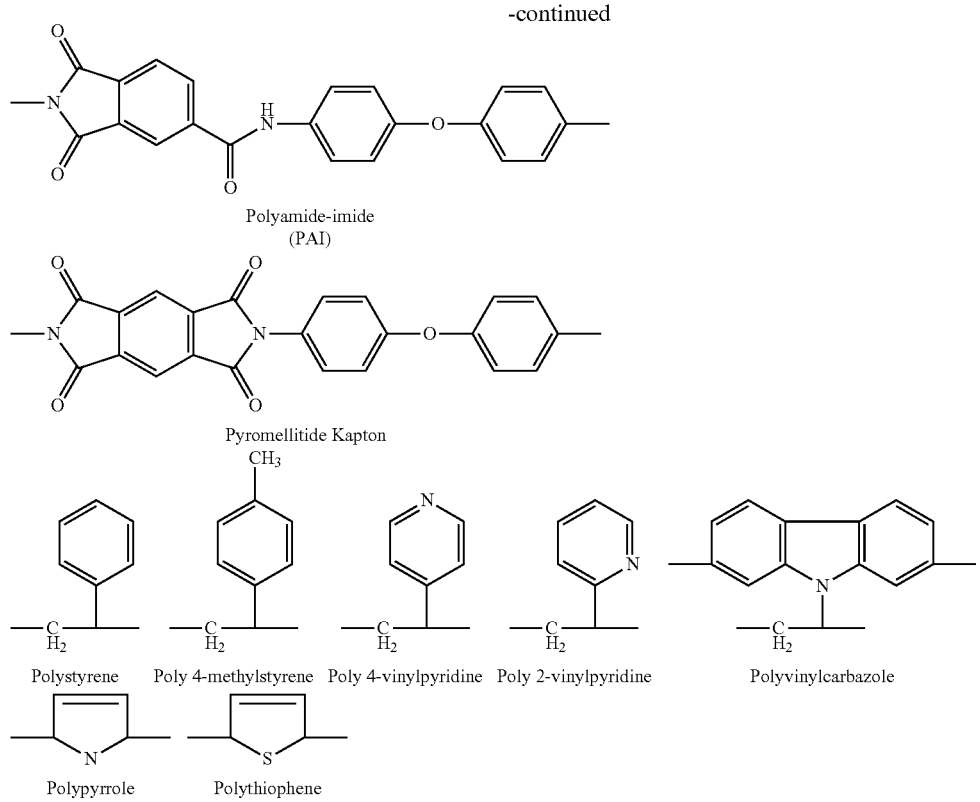

The present invention also concerns a process as defined above, characterised in that les polymers are composed of monomeric unit having at least one aromatic unit, in particular a pendant aryl group, and at least an alkane unit, the said polymers being chosen from: random copolymers, alternate copolymers et block copolymers (diblock, triblock, multiblock or radial).

Alternate copolymers are polymers of the form: -ABABABAB-.

Block or sequential copolymers are polymers of the form:
-AAAAAABBBBBBAAAAAABBBBBBB- or
-AAAAAABBBBBBCCCCCCAAAAAABBBBBB- Random copolymers are polymers of the form:
-AABABBAAABABB- Bisequential copolymers are polymers of the form: -(A)$_n$-(B)$_t$-

Trisequential copolymers are polymers of the form: -(A)$_m$-(B)$_n$-(A)$_t$-

Star copolymers (or radical) are polymers of the form:

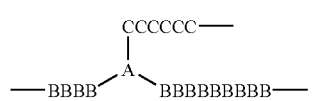

A, B and C representing monomeric units as defined above.

The present invention also concerns the process as defined above, characterised in that the polymer surface is in the form of a sheet, a plate, a knitted material, a tube, for example a catheter, strands, nails or screws, balls, objects of different forms being able to serve as prostheses or extra or intraocular lenses.

According to a preferred embodiment, the process of the invention is characterised in that it does not include a reticulation step.

The present invention also concerns a process as defined above, characterised in that the step to react HO• hydroxyl radicals is carried out for about 5 minutes to about 5 hours.

The present invention also concerns a process as defined above, characterised in that it includes a subsequent functionalisation step on the hydroxyl groups bound on the polymer surface.

Among the subsequent functionalisation reactions, one can cite: the formation of esters by reaction with a carboxylic acid, ethers by Williamson reaction with another alcohol, halides by reaction with halide acids or PCl$_5$, N-alkylamides by Mitsunobu reaction or sulfides by reaction with thiols.

Generally, post-functionnalisation allows one skilled in the art to place an organic function of choice on the surface for a targeted application, for example in the biomedical domain, adhesion and non-adhesion proteins, binding of pharmaceutical substances, antimicrobials . . . .

Subsequent functionalisation reactions allow to give specific properties on the surface: for example by binding biologically-active molecules (for example, enzymes) or molecules having pharmaceutical properties. This can be carried out by binding the OH group on the surface either directly to the desired molecule or by an intermediate on an intermediate linkage. One can link alcoholic functionality by ester formation (by reaction with an anhydride, an acid chloride or even an acid), amide formation (by reaction with isocyanates) or ether formation (by reaction with alkyl halides).

The present invention also concerns a hydroxylation process as defined below, characterised in that the contact angle measured between the drop of water and the hydroxylated surface obtained decreases to more than 5°, particularly, to more than 10° relative to the contact angle measured between a drop of water and a non-hydroxylated surface.

The contact angle is measured by depositing a drop of water on the polymer surface with a syringe, then measuring with the help of a microscope the angle formed between the polymer surface and the tangent of the drop by its contact point with the polymer.

The more the surface is hydrophilic, the more the measured contact angle is small, and the more the surface is hydrophobic, the more the measured contact angle is large.

The present invention also concerns a process as defined above, characterised in that the hydroxylated, alkoxylated or oxycarbonylated surfaces obtained are time stable, particularly during many weeks, according to the following test:

The infrared spectra of PET and PEEK samples, modified by a ElectroFenton reaction either during 10 minutes, or during 120 minutes, then trifluoroacetylated, are re-recorded after 74 days. By recording the spectral differences (t=0 and t=74 days), no significant differences and in particular no disappearance of characteristic bands corresponding to trifluoroacetyl groups are noted.

The present invention also concerns hydroxylated, alkoxylated or oxycarbonylated surfaces obtained by the use of the process of the invention as defined above.

As shown by the measurement of the contact angles reported in the following experimental part, the treated surfaces have become hydrophilic (in the case of hydroxylation) and will be consequentially much more bio-compatible.

The bond between the polymer and the OH group is a covalent bond whose energy is in the range of 390 ($CH_3OH$) to 470 kJ/mol ($C_6H_5OH$).

I—ELECTRO-FENTON REACTION

Hydroxylation of Polyethyleneterephthalate (PET) of Polyetherether ketone (PEEK) and of Acrylonitrile-Butadiene-Styrene (ABS)

Substrates
knitted PET and ES 304045 sheet
PEEK (Goodfellow EK 113000 sheet)
ABS plate (Goodfellow, AB3030090) [obtained by dispersing an elastomeric phase (butadiene) in a styrene phase (SAN) obtained by copolymerisation of acrylonitrile with styrene]
Electrochemical Device:
Non-separated compartment cell.
Anode: carbon.
Cathode: carbon felt (approximately 10 $cm^2$).

The polymer sheet or knitted material was tightened against one sheet or placed between two carbon felt sheets serving as the cathode.

Solvent 0.1M $H_2SO_4$ brought to pH 3 with sodium hydroxide
Catalyser 0.5 mM $Fe^{2+}$ ($FeSO_4 \cdot 7H_2O$)
Continuous air bubbling
Galvanostatic method: Constant current: 10 mA or 5 mA according to the experiment
Potentiostatic method: Constant potential E=−0.6V/SCE
A) Hydroxylation of PET
Hydroxylation of a Sheet
a) By galvanostatic i=5 mA, 2 hours
The counter-electrode was short-circuited on the reference.
The cathode potential was increased from approximately −0.6V/SCE at the beginning of the experiment to approximately −2V/SCE at the end of the electrolysis, at this potential the protons were reduced and therefore the reduction efficiency of oxygen was reduced.

The samples were carefully rinsed with distilled water during 10 minutes under sonication, then 10 minutes in acetonitrile (for analysis) and dried at 40° C. under vacuum overnight.

b) By potentiostatic, the current decreased from approximately 30 to 10 mA. The samples were treated as described above.

For IR analysis, the samples were treated with a solution of trifluoroacetic anhydride (1 mL) in ether (30 mL) overnight, rinsed with acetonitrile then dried under vacuum overnight. The results are shown in Table 1.

TABLE 1

IR analysis of a hydroxylated then trifluoroacetylated PET sheet*

| Band positions in $cm^{-1}$ | Attribution | By comparison |
|---|---|---|
| 1794 | C=O | The C=O band of PET itself was found at 1714 $cm^{-1}$<br>≈1813 $cm^{-1}$ for $(CF_3CO)_2O$<br>≈1780 $cm^{-1}$ for $CF_3COOH$ |
| 1131, 1270 | $CF_3$ | ≈1160, 1240 $cm^{-1}$ for $(CF_3CO)_2O$ |

Reference: non-treated PET sheet.

No significant differences between the galvanostatic or potentiostatic experiments were observed.

The contact angle of a water drop decreased by approximately 90, it was little different immediately after the drop was deposited but it decreased after reaching 55° after approximately 5 minutes.

The ToF-SIMS analysis confirmed well the surface trifluoromethylation

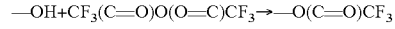

—OH+$CF_3(C=O)O(O=C)CF_3$→—$O(C=O)CF_3$ as shown by the fragments described in Table 2.

TABLE 2

ToF-SIMS analysis of a hydroxylated then trifluoroacetylated PET sheet

| m/z | Attribution |
|---|---|
| 19 | $F^-$ |
| 69 | $CF_3^-$ et $CF_3^+$ |
| 85 | $OCF_3^-$ |
| 95 | $CH=CHCF_3^-$ |
| 97 | $OC(=O)CF_3^-$ |
| 105 | $C_6H_5C(=O)$ |
| 213 | {$C(=O)OCH_2CH(OC(=O)CF_3)C(=O)H$}$^-$ or isomer |

Knitted Material Hydroxlation
Electrolysis 1 hour. Galvanostatic method: i=10 mA
IR analysis: by difference with a non-treated sample, a band at 3380 $cm^{-1}$ was observed being able to be attributed to a OH stretching vibration.

Contact angle: on a knitted material, it was approximately 90° on a non-treated sample whereas on a treated sample as above the drop of water passed through the fabric spreading itself out completely.

ToF-SIMS analysis of the hydroxylated surface presented a peak at m/z=138 that can be attributed to the ion [0-(C=O)$C_6H_4OH$]$^-$ (the same protonated species was visible as a positive ion), which corresponded to a fragment of the hydroxylated polymer.

B) Hydroxylation of PEEK
Goodfellow Sheet
Treated under the same conditions as above by galvanostatic and by potentiostatic.

ToF-SIMS analysis, showed, as opposed to the non-treated reference, a peak (as a negative ion) at m/z=231 to which can be attributed the formula $HOC_6H_4C(=O)C_6H_3(OH)_2$; peaks at m/z=97, 79 (97-$H_2O$) and 63 (79-O).

After trifluoroacetylation, the two samples were analysed by IR.

TABLE 3

IR analysis of a hydroxylated then trifluoroacetylated PEEK sheet*

| Band position in cm$^{-1}$ | Attribution | By comparison |
|---|---|---|
| 1788 | $C(=O)CF_3$ | The C=O band of PEEK itself was found at 1653 cm$^{-1}$ (benzophenone unit) |
| 1217, 1186 | $CF_3$ | ≈1160, 1240 cm$^{-1}$ for $(CF_3CO)_2O$ |

Reference: non-treated PEEK sheet.

TABLE 4

ToF-SIMS anaylsis of a Goodfellow PEEK sheet.

| m/z | Attribution |
|---|---|
| 19 | F$^-$ |
| 69 | $CF_3^-$ |
| 113 | $OC(=O)CF_3^-$ |
| 265 | $C_6H_4C(=O)C_6H_4(CF_3)O^-$ |
| 293 | $C_6H_4C(=O)C_6H_4[OC(=O)CF_3]^-$ |
| 323 | $C_6H_4C(=O)C_6H_4[OC(=O)CF_3]O^-$ |
| 197 | $C_6H_5C(=O)C_6H_4O^+$ |
| 212 | $OC_6H_4C(=O)C_6H_4O^+$ |
| 289 | $OC_6H_4C(=O)C_6H_4OC_6H_4O^+$ |

No significant differences between galvanostatic or potentiostatic experiments were observed.

The contact angle of a water drop on PEEK was 87°, it decreased to 65° after treatment by the potentiostatic ElectroFenton reaction.

C) Hydroxylation of ABS

Treated under the same conditions as above by galvanostatic and by potentiostatic.

The IR spectrum of the hydroxylated surface was recorded.

TABLE 5

IR spectrum of ABS after treatment.

| Band position in cm$^{-1}$ | Attribution |
|---|---|
| 3240 | O—H |
| 1050 | C—O primary alcohol |

*after subtraction of a non-treated reference, the samples were dried under vacuum at 40° C. for 2 days to assure that the OH bands did not come from residual humidity.

The sample was trifluoroacetylated as above. To obtain a reference, the trifluoroacetylation treatment was carried out on a sample which had not been hydroxylated.

TABLE 6

IR analysis of a hydroxylated then trifluoroacetylated ABS sheet*

| Band Position in cm$^{-1}$ | Attribution | By comparison |
|---|---|---|
| 1765 | C=O | ≈1813 cm$^{-1}$ for $(CF_3CO)_2O$ ≈1780 cm$^{-1}$ for $CF_3COOH$ |
| 1245 shouldering | CF3 | ≈1160, 1240 cm$^{-1}$ for $(CF_3CO)_2O$ |
| 1160 shouldering | | ≈1190, 1240 cm$^{-1}$ for $CF_3COOH$ |

Reference: non-hydroxylated ABS sheet and subjected to trifluoroacetylation treatment.

TABLE 7

ToF-SIMS analysis of a hydroxylated then trifluoroacetylated ABS sheet*

| m/z | Attribution |
|---|---|
| 19 | F$^-$ |
| 69 | CF3$^-$ |
| 97 | $C(=O)CF3^-$ |
| 145 | $OC(=O)CF3^-$ |
| 228 | $NC—(CH_2)_5—OC(=O)CF_3^+$ |

The contact angle of a drop of water on ABS was 69°, it decreased to 37° after treatment with the potentiostatic ElectroFenton reaction.

Influence of Reaction Time on Polymer Grafting

"Envelopes" of carbon felt each containing a sample of PEEK or PEEK were introduced in the ElectroFenton solution. The ElectroFention reaction was carried out in potentiostatic mode as described above. The envelopes were recovered from the solution after 10, 30, 60, 90, 120 minutes; the polymer samples were rinsed with a wash bottle containing distilled water, twice for 15 minutes with distilled water, once for 15 minutes with acetonitrile under sonication for analysis and dried under vacuum at 40° C. for 2 days (at the same time as the references). The IR spectra were recorded and analysed after subtraction from the reference.

PET

Analysis of the band at 1714 cm$^{-1}$ (very weak) of PET itself showed that it practically disappeared after 30 minutes whereas the band at 1131 cm$^{-1}$ (strong) practically disappeared after 60 minutes of reaction.

PEEK

To the difference of the polymers above, no significant variation in the $CF_3$ bands 1217 and 1186 cm$^{-1}$ (the C=O band towards 1788 cm$^{-1}$ was too weak to be analysed) were observed.

It seemed that the hydroxylation reaction of PET reached a maximum around 10 to 30 minutes whereas the PEEK hydroxylation stayed constant after 10 minutes of reaction. A reaction time of 10 minutes was therefore sufficient to reach the maximum hydroxylation and further reaction beyond this time led to the PET degradation.

Grafting Stability as a Function of Time

After 74 days, the infrared spectra of PET and PEEK samples modified by the electroFenton reaction either for 10 minutes, or for 120 minutes then trifluoroacetylated were recorded. By recording the difference between the spectra (t=0 and t=74 days), no significant differences and in particular no disappearance of the characteristic trifluoroacetyl group bands were observed.

II—PHOTO-FENTON REACTION

Hydroxylation of Polyethylencterephthalate (PET) and Polyetherether Cetone (PEEK)

Substrates
PET and sheet (DSM)
PEEK (Goodfellow sheet)

EXAMPLE 1

A 2 L glass reactor equipped with a circulation pump, a thermostated double-jacket and a low pressure mercury lamp placed in the middle of the reactor in a quartz tube was filled with 2 L of a 1 mM HCl solution in water, 1 g of ferric chloride and 2 mL of hydrogen peroxide. The polymer samples were suspended in the solution. The pump and irradiation were started; after 2 h 30, the irradiation was stopped. The samples were rinsed for 15 minutes with distilled water under sonication then with acetone and dried under vacuum at 40° C. overnight.

The calculation of contact angles with water was carried out before and after treatment.

TABLE 8

Contact angles of polymer samples treated by PhotoFenton.

| Sample | Contact angle before treatment | Contact angle after treatment |
|---|---|---|
| PET | 90 | 88[a] |
|  |  | 62 (after 5') |
| PEEK | 87 | 60 |

[a] Immediately after the deposit of the drop
b) without notable decrease in the drop size.

The samples were then treated with trifluoroacetic anhydride (0.4 ml in 10 ml, of ether) and analysed by IR. Of the three samples, the bands towards 1206-1254 cm$^{-1}$ and 1165-1185 cm$^{-1}$ were well observed, which were attributed to the group $CF_3$ by comparison with the spectra of trifluoroacetic acid and trifluoroacetic anhydride. The vibration corresponding to the carbonyl group $(C=O)CF_3$ was observable on PEEK. These spectra confirmed well the modification on the polymer surface.

TABLE 9

IR spectra of the trifluoroacetylated samples.

| Sample | IR Absorption in cm$^{-1}$ | Attribution |
|---|---|---|
| PET | 1254 s | $CF_3$ (1248 for $CF_3CO)_2O$ and 1240 for $CF_3COOH$) |
|  | 1165 m | $CF_3$ (1195 for $CF_3CO)_2O$ and 1177 for $CF_3COOH$) |
| PEEK[a] | ≈1800 vw | $C=O$ (≈1790 cm$^{-1}$ for $CF_3COOH$) |
|  | 1215 m | $CF_3$ (1248 for $CF_3CO)_2O$ and 1240 for $CF_3COOH$) |
|  | 1185 m | $CF_3$ (1195 for $CF_3CO)_2O$ and 1177 for $CF_3COOH$) |

[a] after subtraction of the polymer spectrum itself

TABLE 10

ToF-SIMS spectra of trifluoroacetylated samples

| Sample | m/z | Attribution |
|---|---|---|
| PET | 19 | $F^-$ |
|  | 69 | $CF_3^-, CF_3^+$ |
|  | 85 | $OCF_3^-$ |
|  | 97 | $COCF3^-$ |
| PEEK[a] | 19 | $F^-$ |
|  | 69 | $CF_3^-, CF_3^+$ |
|  | 85 | $OCF_3^-$ |
|  | 97 | $COCF3^-$ |
|  | 113 | $[O(C=O)CF_3]^-$ |
|  | 370 | $[C_6H_4(C=O)C_6H_3(OCF_3)OC_6H_4O-2H]^+$ |

The contact angle variation, the IR spectra and the ToF-SIMS spectra confirmed well the polymer grafting by the $OCF_3$ groups after treatment with acetic anhydride, therefore surface hydroxylation.

Analogous Reaction to the Fenton Reaction, Using Lauroyl Peroxide

The PET samples were prepared as above and placed in 360 ml of a solution of 0.1N $H_2SO_4$ brought to pH 3 by adding sodium hydroxide to which was added 400 mg of lauroyl peroxide $(CH_3(CH_2)_{10}C(-O)OOC(=O)(CH_2)_{10}CH_3)$ (saturated solution) and 55 mg of $FeSO_4$, $5H_2O$ (0.5 mM). The enveloped samples in carbon felt were used as the cathode, the potential was fixed at −0.6 V/SCE for 2 hours, then they were washed with tap water, twice with distilled water under sonication for 10 minutes, then once with acetone under sonication for 10 minutes and finally dried under vacuum. To increase the lauroyl peroxide solubility, a 50% solution of acetonitrile was added to the solution without notable change in the results (outside of the relative peak intensity in ToF-SIMS). The PET samples were analysed by ToF-SIMS and it was observed that PET presented a modified surface.

TABLE 11

ToF-SIMS analysis of PET samples treated with lauroyl peroxide under the conditions of the Fenton reaction.

| m/z | Attribution |
|---|---|
| PET |  |
| 155 | $CH_3(CH_2)_{10}^-$ |
| 185 | $CH_3(CH_2)_{10}C(=O)H^-$ |
| 213 | $CH_3(CH_2)_{10} +CH_2OC(=O)$ |
| 223 | $CH_2OC(=O)C_6H_5C(=O)O(CH_2)_2OH$ |

CONCLUSION

Many examples of hydroxylation of polymer surfaces by the Fenton reaction either by photochemistry or electrochemistry have been described. The reaction proves efficient, in particular on poorly reactive polymers such as PEEK. This reaction is not specific to polymer functions and therefore is susceptible to be applied to any polymer. The reaction with lauroyl peroxide on PET under the conditions of the Fenton reaction has also been demonstrated.

The invention claimed is:

1. A method for hydroxylation, alkoxylation or oxycarbonylation of polymer or polymer mixture surfaces, comprising:
    generating RO• radicals by electrochemical or photochemical means, wherein
    R is selected from the group consisting of:
    a hydrogen;
    an alkyl group having 2 to 15 carbon atoms;
    an acyl group —COR' in which R' represents an alkyl group having 2 to 15 carbon atoms; and
    an aroyle group —COAr in which Ar represents an aromatic group having 6 to 15 carbon atoms, and
    said polymers consisting of monomeric units of which at least 50% are aromatic units.

2. A method for hydroxylation, alkoxylation or oxycarbonylation of polymer or polymer mixture surfaces, comprising:
    carrying out a Fenton reaction by out by electrochemical or photochemical means, said polymers consisting of monomeric units of which at least 50% are aromatic units, and the said Fenton reaction being carried out by electrochemical or photochemical means.

3. A process for hydroxylation, alkoxylation or oxycarbonylation of polymer or polymer mixture surfaces, said polymers consisting of monomeric units of which at least 50% among these are aromatic units, to obtain a hydroxylated, alkoxylated or oxycarbonylated surface, said process comprising:

reacting said surface with RO˙ radicals, said RO˙ radicals being generated by electrochemical or photochemical means, wherein R is selected from the group consisting of:

a hydrogen;

an alkyl group having 2 to 15 carbon atoms;

an acyl group —COR' in which R' represents an alkyl group having 2 to 15 carbon atoms; and an aroyl group —COAr in which Ar represents an aromatic group having 6 to 15 carbon atoms.

4. The hydroxylation process according to claim 3, consisting of reacting the surface with HO˙ hydroxyl radicals.

5. A hydroxylation process of a polymer surface, said polymers consisting of monomeric units of which at least 50% among these are aromatic units, the said polymers being selected from the group consisting of:

polycarbonate (PC), polyphenylenesulfide (PPS), polyphenylene ether (PPE), polyetherether ketone (PEEK), polyethyleneterephthalate (PET), polyether sulfone (PES), polyaromatic amide (PPA), polybisphenolterephthalate (PAR), polyetherimide (PEI), polyamide-imide (PAI), polypyrromellitide, polystyrene, poly(4-methylstyrene), poly(4-vinylpyridine) (4VP) or poly(2-vinylpyridine) (2VP) and polyvinylcarbazole, to obtain a hydroxylated surface, said process comprising reacting the said surface with HO˙ hydroxyl radicals obtained by carrying out the Fenton reaction, by electrochemical or photochemical means (Electro Fenton or PhotoFenton reaction).

6. The process according to claim 5, wherein the HO˙ hydroxyl radicals are obtained by mixing hydrogen peroxide and ferric ($Fe^{3+}$) or ferrous ($Fe^{2+}$) ions.

7. The process according to claim 3, wherein the polymers contain monomeric units, and said polymers having a molecular weight from 500 daltons to 5 million daltons.

8. The process according to claim 3, wherein the surface of the polymers is in a form selected from the group consisting of:

a sheet;
a knitted material;
a tube;
strands;
nails or screws;
balls; and
objects of different forms being able to serve as prostheses or extra or intraocular lenses.

9. The process according to claim 3, wherein the step of reacting the surface with the HO˙ hydroxyl radicals is carried out for 5 minutes to 5 hours.

10. The process according to claim 3, further comprising a subsequent functionalisation step on the hydroxyl groups linked to the hydroxylated surface.

11. An hydroxylated, an alkoxylated or an oxycarbonylated surfaces obtained by carrying out the process according to claim 3.

12. The process according to claim 5, wherein the polymers contain monomeric units, and said polymers having a molecular weight from 500 daltons to 5 million daltons.

13. The process according to claim 5, wherein the surface of the polymers is in a form selected from the group consisting of:

a sheet;
a tube;
strands;
nails or screws;
balls; and
objects of different forms being able to serve as prostheses or extra or intraocular lenses.

14. The process according to claim 5, wherein the step of reacting the surface with the HO˙ hydroxyl radicals is carried out for 5 minutes to 5 hours.

15. The process according to claim 5, further comprising a subsequent functionalisation step on the hydroxyl groups linked to the hydroxylated surface.

16. An hydroxylated, an alkoxylated or an oxycarbonylated surfaces obtained by carrying out the process according to claim 5.

17. The process according to claim 3, wherein the aromatic units are selected from the group consisting of:

phenyl, anthryl, naphthyl, biphenyl, phenanthryl, pyrenyl, pyridyl, pyrimidyl, pyrazinyl, pyridazinyl, quinoxalyl, quinazolyl, quinolinyl, thiophenyl, pyrrolyl, phenathrolinyl, phenanthridinyl, indolyl and carbazolyl.

* * * * *